(12) United States Patent
Haase et al.

(10) Patent No.: US 11,341,189 B2
(45) Date of Patent: May 24, 2022

(54) MULTI-CHARACTER STRING SEARCH ENGINE FOR IN-VEHICLE INFORMATION SYSTEM

(71) Applicant: Harman International Industries, Incorporated, Stamford, CT (US)

(72) Inventors: Robert Haase, Farmington Hills, MI (US); Steven Edward Montealegre, Mary Esther, FL (US); Lipka Volker, Farmington Hills, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 175 days.

(21) Appl. No.: 15/565,271

(22) PCT Filed: Apr. 10, 2015

(86) PCT No.: PCT/US2015/025407
§ 371 (c)(1),
(2) Date: Oct. 9, 2017

(87) PCT Pub. No.: WO2016/164045
PCT Pub. Date: Oct. 13, 2016

(65) Prior Publication Data
US 2018/0075164 A1 Mar. 15, 2018

(51) Int. Cl.
*G06F 16/903* (2019.01)
*G06F 16/2457* (2019.01)

(52) U.S. Cl.
CPC .... *G06F 16/90344* (2019.01); *G06F 16/2457* (2019.01); *B60K 2370/143* (2019.05); *B60K 2370/148* (2019.05); *B60W 2556/50* (2020.02)

(58) Field of Classification Search
CPC .......... G06F 16/90344; G06F 16/2457; G06F 16/00; G06F 3/017; G06F 16/248;
(Continued)

(56) References Cited

U.S. PATENT DOCUMENTS

| 4,655,621 | A | * | 4/1987 | Holden | ................. | G06F 3/0235 400/100 |
| 5,450,580 | A | * | 9/1995 | Takada | .................... | G06F 16/30 |

(Continued)

FOREIGN PATENT DOCUMENTS

| CN | 101082920 A | 12/2007 |
| CN | 101855521 A | 10/2010 |

OTHER PUBLICATIONS

International Search Report Application No. PCT/US2015/025407, dated Nov. 25, 2015, 2 pages.

*Primary Examiner* — Pierre M Vital
*Assistant Examiner* — Andalib F Lodhi
(74) *Attorney, Agent, or Firm* — Artegis Law Group, LLP

(57) ABSTRACT

One embodiment of the present invention sets forth a method of selecting an entry in a database in an in-vehicle infotainment system. The method includes receiving a second single-character input after receiving a first single-character input, generating a multi-character search string in which the first character of the multi-character search string is the first single-character input and the second character of the multi-character search string is the second single-character input, searching a database stored in the in-vehicle infotainment system for entries that match the multi-character search string, and causing a number of entries that match the multi-character search string to be displayed by the in-vehicle infotainment system. An advantage of the disclosed embodiment is that a vehicle operator can effectively search through a large number of entries in an in-vehicle system with reduced distraction and without stopping the vehicle.

19 Claims, 3 Drawing Sheets

(58) Field of Classification Search
CPC .......... G06F 16/29; G06F 16/71; G06F 16/73; G06F 16/738; G06F 16/7844; G06F 16/148; G06F 16/156; G06F 16/2428; G06F 16/243; G06F 16/25; G06F 16/3334; G06F 16/334; G06F 16/34; G06F 16/35; G06F 16/358; G06F 16/7867; B60K 2370/143; B60K 2370/148; B60W 2550/402; B60W 2556/50

See application file for complete search history.

(56) References Cited

U.S. PATENT DOCUMENTS

| | | | | |
|---|---|---|---|---|
| 8,612,213 | B1* | 12/2013 | Zhai | G06F 40/232 704/9 |
| 2003/0088550 | A1* | 5/2003 | Menashe | G06F 16/951 |
| 2012/0197523 | A1* | 8/2012 | Kirsch | H04M 1/72451 701/426 |
| 2013/0191122 | A1 | 7/2013 | Mason | |
| 2013/0205258 | A1* | 8/2013 | Ecker | G06F 3/0482 715/822 |
| 2014/0115519 | A1* | 4/2014 | Ouyang | G06F 3/04886 715/773 |
| 2014/0280115 | A1* | 9/2014 | Collin | G06F 16/2457 707/731 |
| 2014/0304248 | A1 | 10/2014 | Krakirian et al. | |
| 2015/0148019 | A1* | 5/2015 | Michaelis | H04W 4/027 455/418 |
| 2015/0378982 | A1* | 12/2015 | Mckenzie | G06F 3/0237 715/261 |
| 2015/0379127 | A1* | 12/2015 | Mueller | G06F 16/2468 707/741 |
| 2016/0026644 | A1* | 1/2016 | Schumann | G01C 21/28 707/767 |
| 2016/0069700 | A1* | 3/2016 | Koertge | G01C 21/3611 701/538 |
| 2016/0170491 | A1* | 6/2016 | Jung | G06F 3/0488 715/856 |
| 2016/0188184 | A1* | 6/2016 | Garcia, Jr. | G06F 3/04847 715/780 |
| 2016/0313868 | A1* | 10/2016 | Weng | H04L 65/4069 |

\* cited by examiner

MULTI-CHARACTER STRING SEARCH ENGINE FOR IN-VEHICLE INFORMATION SYSTEM

CROSS-REFERENCE TO RELATED APPLICATIONS

The present application is a national stage application of the international application titled, "MULTI-CHARACTER STRING SEARCH ENGINE FOR IN-VEHICLE INFORMATION SYSTEM," filed on Apr. 10, 2015 and having application number PCT/US2015/025407. The subject matter of this related application is hereby incorporated herein by reference.

BACKGROUND

Field of the Invention

Embodiments of the present invention relate generally to infotainment systems and, more specifically, to a multi-character string search engine for an in-vehicle information system.

Description of the Related Art

In-vehicle infotainment (IVI), also referred to as in-car entertainment (ICE), includes the many hardware and software products, devices, and systems that can be integrated in or added to vehicles to enhance the driver and/or passenger experience. IVI has become a common feature in modern automobiles and other forms of transportation, and may provide audio or video entertainment, automotive navigation, driver assistance, video gaming capability, Internet connectivity, and the like to passengers and drivers.

Generally, the user interface for IVI systems is configured to limit driver distraction by adhering to established distraction standards that limit how much information is presented to a driver. For example, for a vehicle in motion, the Alliance of Automobile Manufacturers (AAM) driver distraction guideline includes a maximum number of entries that can be displayed to a vehicle operator on a user interface screen, as well as a maximum number of screens available for the vehicle operator to page through. Consequently, the total number of entries that can be made available for the vehicle operator is limited, for example on the order of 20 or 30 total entries.

As IVI becomes more sophisticated, user interactions have become more complex. For example, using a typical vehicle navigation system to locate a particular restaurant may involve sorting through a very large number of entries to select the desired location. This is because single-character search algorithms employed by vehicle navigation systems present all entries in a given search category that begin with the single-character search criterion. Because the number of restaurants meeting the search criterion (i.e., having a name beginning with the single-character search criterion) can far exceed the total number of entries that can be made available to the vehicle operator, the desired location may not be presented to the vehicle operator at all, and the vehicle must be stopped to access the remaining entries. Searching for a personal contact entry via an IVI system can have a similar result. Because personal contact databases may include hundreds or thousands of contacts, the search results of an IVI system frequently cannot be displayed in their entirety to the vehicle operator while a vehicle is in motion due to limits imposed by distraction standards.

As the foregoing illustrates, user interactions with IVI systems can be problematic. Accordingly, what would be useful are techniques to more efficiently interact with an IVI system.

SUMMARY

One embodiment of the present invention sets forth a method of selecting an entry in a database in an in-vehicle infotainment system. The method includes receiving a second single-character input after receiving a first single-character input, generating a multi-character search string in which the first character of the multi-character search string is the first single-character input and the second character of the multi-character search string is the second single-character input, searching a database stored in the in-vehicle infotainment system for entries that match the multi-character search string, and causing a number of entries that match the multi-character search string to be displayed by the in-vehicle infotainment system.

At least one advantage of the disclosed embodiments is that a vehicle operator can effectively search through a large number of entries in an IVI system with reduced distraction and without stopping the vehicle, even when there are strict limits on how many entries can be displayed to the vehicle operator at one time.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
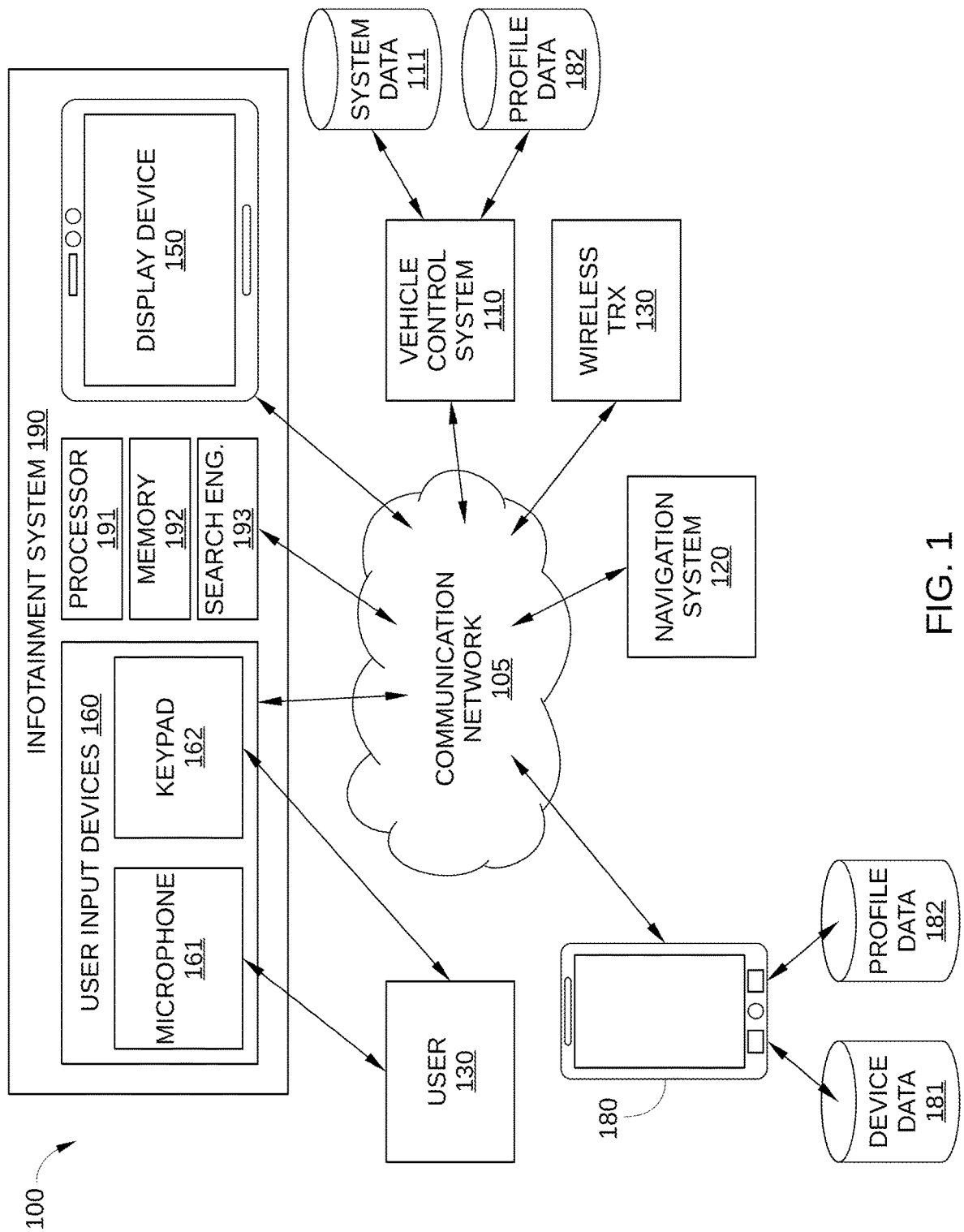
FIG. 1 is a block diagram illustrating a vehicular information system, configured according to various embodiments.

FIG. 1 is a block diagram illustrating a vehicular information system 100, configured according to various embodiments. Vehicular information system 100 may include, without limitation, hardware and/or software systems configured to perform various operations for an associated vehicle (not shown) and infotainment systems for the vehicle, such as navigation systems, media players (e.g., music, video, and/ or video game players), wireless Internet connectivity, and the like. The operations may include, without limitation, providing information to a user 101, receiving input from user 101, and controlling the functions or operation of the vehicle associated with vehicular information system 100. User 101 may be the operator of the vehicle or a passenger in the vehicle. Vehicular information system 100 may include, without limitation, a vehicle control system 110, a navigation system 120, a wireless transceiver 130, a display device 150, and user input devices 160, all mutually interconnected via a communication network 105.

Vehicle control system 110 may include, without limitation, any type of computing system and associated sensors and actuators operable to conduct diagnostic, vehicular control, environmental control, and driver assist operations. For example, vehicle control system may include, without limitation, any suitable processor, memory, communication ports, and the like that are operable to conduct such operations. In some embodiments, vehicle control system stores system data 111 and/or profile data 182. System data 111 may be any type of data facilitating operation of vehicle control system 110, and may be configured as any data system that may interface with vehicle control system 110. Vehicle control system 110 may be implemented as hardware, software, firmware, computer readable media, or any combinations thereof.

Navigation system 120 may be any technically feasible navigation system that may use location data to provide navigation information or control the vehicle. For example, but without limitation, navigation system 120 may employ location data from the Global Positioning System (GPS). Navigation system 120 may include, without limitation, several components or modules, such as: a GPS antenna/receiver operable to receive signals from a GPS satellite or other navigation system; a maps database to store information about maps, geographical information system information, and location information; a location module operable to acquire position data, as from the GPS antenna/receiver, to locate the vehicle on a road in the map database; a traffic information database operable to store, update, and retrieve information about communications with other vehicles or any active instructions from the automated traffic system, a dedicated display device, and the like. Navigation system 120 may be implemented as hardware, software, firmware, computer readable media, or any combinations thereof.

Wireless transceiver 130 may be any technically feasible system operable as a wireless access point that provides a wireless communications link between one or more of vehicle control system 110, navigation system 120, display device 150, user input devices 160, and a mobile computing device 180. For example, but without limitation, wireless transceiver 130 may be a Bluetooth® access point. Alternatively or additionally, wireless transceiver 130 may be configured with cellular communication capability, satellite telephone communication capability, a wireless wide area network communication capability, or other types of communication capabilities that allow for vehicle information system 100 to communicate outside the vehicle associated with vehicle information system 100.

Display device 150 may be a video display screen configured to present video media to user 101, such as output from a back-up camera, navigation information, entertainment content, etc. As shown, display device 150, along with one or more user input devices 160, may be incorporated into an infotainment system 190. Alternatively or additionally, display device 150 may be integrated into a dashboard of the vehicle associated with vehicle information system 100. In some embodiments, display device 150 may not be incorporated into infotainment system 190, and may instead be a separate device. For example, and without limitation, display device 150 may be a component of navigation system 120. In some embodiments, display device 150 is configured with a touch-sensitive screen, and consequently may also be used as an input device by user 101. For example, and without limitation, in such embodiments, user 101 may make selections and/or enter data into infotainment system 190 via display device 150.

User input devices 160 enable user 101 to provide input to infotainment system 190 and navigation system 120. Thus, via user input devices 160, user 101 may select navigational targets, initiate telephone calls, and otherwise interact with infotainment system 190. User input devices 160 may include, without limitation, one or more microphones 161 and/or keypads 162. Microphone 161 enable voice-activated instructions to be received by infotainment system 190, while keypad 162 enables instructions to be entered via physical gestures on a touch-sensitive screen or actuation/depression of mechanical buttons. In some embodiments, keypad 162 may be configured as selectable alpha-numeric characters displayed on a touch-sensitive screen. In such embodiments, the selectable alpha-numeric characters may be displayed by display device 150 or on a separate display device. Alternatively or additionally, keypad 162 may be configured with mechanical keys, such as a keyboard, or any other mechanical controller, such as video gaming console. In some embodiments, one or more mechanical buttons of keypad 162 are located on the steering wheel of the vehicle or any other location separate from an alpha-numeric portion of the keyboard. For example, but without limitation, such separately located buttons may include on/off buttons, select buttons, mode change buttons, and the like.

Communication network 105 may be any technically feasible communications network that allows data to be exchanged between vehicle control system 110, navigation system 120, display device 150, user input devices 160, and a mobile computing device 180. Specifically, communication network 105 may be any type of wireless and/or wired communication system that may be included within the vehicle associated with vehicle information system 100 or operable to communicate outside the vehicle. Thus, communication network 105 may include a local area communication capability and a wide area communication capability. For example, and without limitation, communication network 105 may include a Bluetooth® wireless system, an 802.11x (e.g., 802.11G/802.11N/802.11AC, wireless system), a CAN bus, an Ethernet network within the vehicle, or other types of communication networks that may function with or be associated with the vehicle. Further, communication network 105 may also include wide area communication capabilities, including one or more of, but not limited to, a cellular communication capability, a satellite telephone communication capability, a wireless wide area network communication capability, or other types of communication capabilities that allow for vehicle information system 100 to communicate outside the vehicle.

Mobile computing device 180 may be any mobile computing device that user 101 may employ while in the vehicle. Thus, examples of mobile computing device 180 include, but are not limited to laptop computers, smart phones, personal digital assistants (PDAs), video game consoles, tablet computers, or any other type of computing device that may be employed while in a vehicle. Mobile computing device 180 may store device data 181 and profile data 182.

Device data 181 may be any type of data that is used in conjunction with mobile computing device 180. For example, device data 181 may include, but is not limited to, operating system data, multimedia data, preferences data, device identification information, or other types of data. Profile data 182 is described above.

Infotainment system 190 may be any technically feasible in-vehicle infotainment (IVI) system, and may include, without limitation, audio and/or video players, a video game console, one or more display devices, such as display device 150, user input device 160, voice-recognition software, and the like. In some embodiments, infotainment system 190 may be integrated in or include a head unit of an automotive stereo system. In some embodiments, infotainment system 190 may include, without limitation, a dedicated processor 191 and a memory 192, whereas in other embodiments, infotainment system 190 may be configured as a subsystem of vehicle control system 110, and share computational resources therewith. Thus, infotainment system 190 may be implemented as a stand-alone or add-on feature, part of the original equipment manufacturer (OEM) controls of the vehicle, or a combination of both. In addition, according to some embodiments, infotainment system 190 includes, without limitation, a search engine 193 configured to perform searches of profile data 182, navigation data, and any other database associated with vehicle information system 100, using a multi-character string. Search engine 193 may be implemented in infotainment system 190 or in vehicle control system 110 as a software program or as firmware. Search engine 193 may include any technically feasible string searching or string matching algorithm, including but not limited to a naïve string search, a finite state automaton-based search algorithm, a Rabin-Karp string search algorithm, and the like.

In operation, search engine 193 facilitates the exchange of information between user 101, mobile computing device 180, vehicle control system 110, navigation system 120, and infotainment system 190. Specifically, after profile data 182 have been downloaded to vehicle control system 110 and/or to infotainment system 190, user 101 can access profile data 182 and/or navigation data with reduced distraction via user input devices 160. For example, and without limitation, user 101 may request a phone number that is included in profile data 182 or navigation data associated with navigation system 120. The request may be made via microphone 161 using voice-activation commands, direct alpha-numeric character input via keypad 162, or a combination of both. According to some embodiments, upon receiving multiple single-character inputs from user 101, search engine 193 generates a multi-character search string, adding the most recently received single-character inputs to the end of the multi-character search string. Search engine 193 then searches the appropriate data base for all entries that satisfy a search criterion based on the multi-character search string, and causes as many of such entries to be displayed as can be presented to user 101 without causing undue distraction, e.g., five to ten. In this way, as additional single-character inputs are received from user 101, the search criterion becomes narrower, and the number of entries found by search engine 193 decreases significantly. Consequently, even if profile data 182 includes hundreds or even thousands of entries in a particular category (e.g., "business contacts," "local restaurants," etc.), the number of entries satisfying the search criterion based on the multi-character search string will be less than the maximum number of entries that can be safely displayed. On such embodiment is illustrated in FIGS. 2A-2C.

Figure 2A:
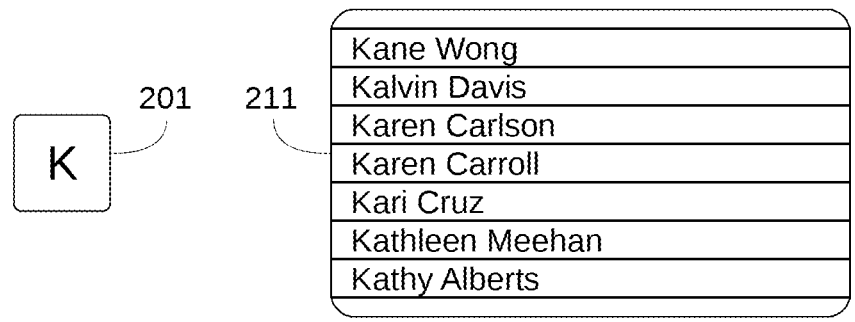
FIGS. 2A-2C illustrate displayed outputs from a search engine in response to receiving a multi-character search string of progressively greater length, according to some embodiments.
Figure 2B:
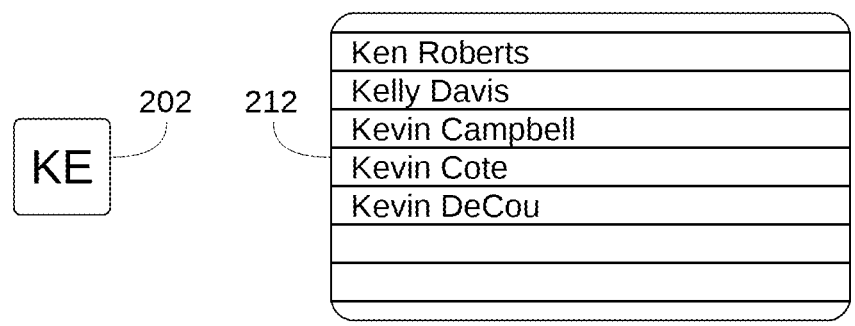
Figure 2C:
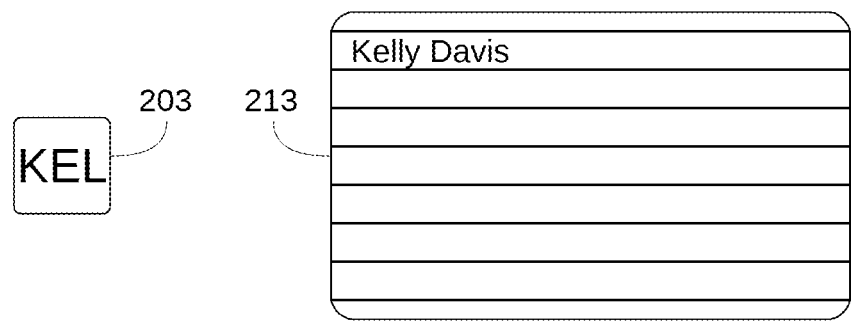

FIG. 2A-2C illustrate displayed outputs from search engine 193 in response to receiving a multi-character search string of progressively greater length, according to some embodiments. For example, and without limitation, user 101 may search for the phone number of a particular contact in profile data 182 (currently stored in vehicle control system 110 and/or infotainment system 190) by entering individual single-character inputs into infotainment system 190. For ease of description, search engine 193 is described herein performing searches based on whether the first word of an entry (e.g., the first name of a contact) satisfies a search criterion based on a multi-character search string, i.e., does the first word of the entry begin with the multi-character search string? In some embodiments, search engine 193 may also perform a search based on whether any word of a particular contact begins with the multi-character search string, or whether any word of a particular contact simply includes the multi-character search string.

In FIG. 2A, user 101 has input a first single-character input 201 (i.e., "K"), either via microphone 161 or keypad 162 of FIG. 1, and, in response, search engine 193 has caused output 211 to be displayed on, for example but without limitation, display device 150 of FIG. 1. The target of the search in this example is the phone number for "Kelly Davis" and, as shown, is not included in output 211, since too many entries in the category "contacts" begin with the letter K. When a single-character search algorithm is used, the search criterion cannot be further narrowed via alpha-numeric inputs, and user 101 is forced to begin paging down through additional entries that are not currently displayed, a potentially unsafe distraction. However, because search engine 193 is configured with a multi-character search algorithm, user 101 can narrow the search by providing additional single-character inputs.

In FIG. 2B, user 101 has input a second single-character input 202 (i.e., "E"), either via microphone 161 or keypad 162, and, in response, search engine 193 has caused output 212 to be displayed. Output 212 includes as many entries that satisfy the multi-character search string "KE" that can be safely displayed. The target "Kelly Davis" is now being shown, but so are a plurality of other contacts, making recognition and selection of the target problematic when user 101 is also operating the vehicle. In FIG. 2C, user 101 has input a third single-character input 203 (i.e., "L"), and, in response, search engine 193 has caused output 213 to be displayed. Output 213 includes as many entries that satisfy the multi-character search string "KEL" that can be safely displayed. In this example, only the target "Kelly Davis" is shown, since no other entries in the category "contacts" begins with "KEL." Thus, by entering a relatively small number of single-character alpha-numeric inputs, user 101 can quickly find a particular entry in profile data 182, navigation data associated with navigation system 120, or any other database associated with vehicle information system 100.

Figure 3:
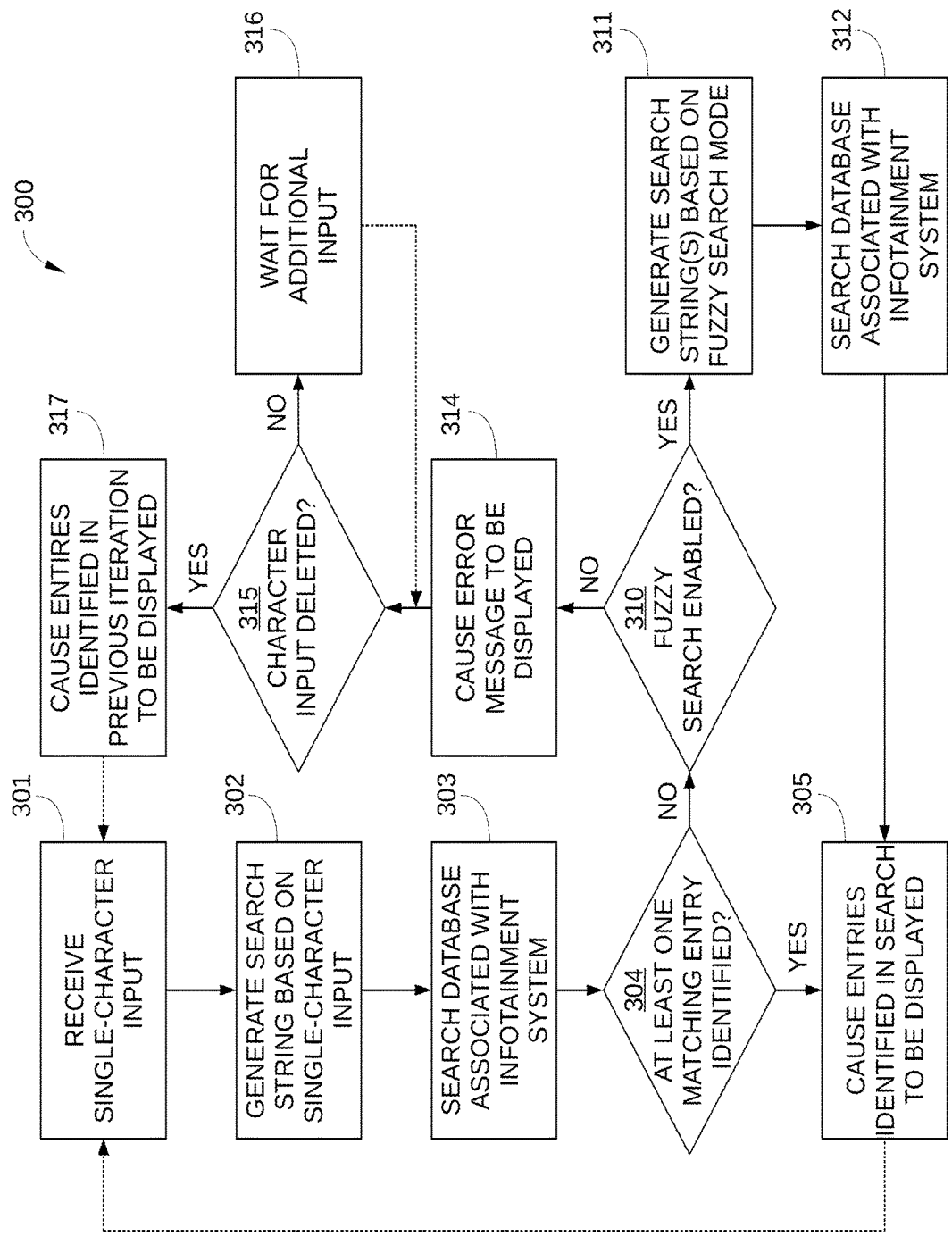
FIG. 3 sets forth a flowchart of method steps for selecting an entry in a database based on a multi-character search string, according to an embodiment.

FIG. 3 sets forth a flowchart of method steps for selecting an entry in a database based on a multi-character search string, according to an embodiment. Although the method steps are described with respect to the systems of FIGS. 1-2C, persons skilled in the art will understand that any system configured to perform the method steps, in any order, falls within the scope of the present invention.

Prior to the method steps, user 101 has synched, downloaded, or otherwise transferred profile data 182 from mobile computing device 180 to infotainment system 190, vehicle control system 110, or navigation system 120. In addition, user 101 has initiated use of search engine 193, for example by inputting a command, via microphone 161 or keyboard 162, that initiates a phone call from a contact list included in profile data 182. In another example, search engine 193 is activated when user 101 selects a navigation application by inputting an appropriate command via microphone 161 or keyboard 162. In response to receiving such a command, infotainment system 190 or navigation system 120 may open an alpha-numeric keypad on display device 150 or other display device associated with infotainment system 190 if such a keypad is not already displayed.

In some embodiments, user 101 may provide a preparatory input to infotainment system 190, vehicle control system 110, or navigation system 120 that initiates search engine 193. In some embodiments, the preparatory input is a verbal command, and in other embodiments, the preparatory input is a signal from a switch or other mechanical button, or a button displayed on a touch-sensitive screen that is actuated or otherwise engaged. For example, but without limitation, the switch or button may be disposed on the steering wheel, armrest, or dashboard of the vehicle. In such embodiments, any voice-recognition software associated with search algorithm 193 can be explicitly set to receive alpha-numeric commands, which are more readily interpreted than conventional verbal input in the noisy environment of a moving vehicle. Thus, the voice-recognition software associated with search algorithm 193 is more likely to correctly interpreter voice inputs during method 300.

As shown, a method 300 begins at step 301, in which search engine 193 receives first single-character input. The single-character input may be any alpha-numeric input and may be received via microphone 161 or keypad 162.

In step 302, search engine 193 generates a search string. The first character of the search string generated in step 302 is the first single-character input received in step 301. It is noted that in a first iteration of step 302, the search string is a single-character search string, but as additional single-character input is received in subsequent iterations of step 302, the search string generated in step 302 is a multi-character search string. When a multi-character search string is generated in step 302, the first character of the search string is the first single-character input received in step 302, the second character of the search string is the second single-character input received, i.e., the single-character input received in the second iteration of step 302, and so on. Thus, the multi-character search string generated in step 302 is composed of single-character input arranged in the order received.

In step 303, search engine 193 searches a database that is stored in infotainment system 190, navigation system 120, vehicle control system 110, or is otherwise associated with vehicle information system 100. In some embodiments, search engine 193 identifies any entry in a specified category that matches the multi-character search string generated in step 302. In some embodiments, search engine 193 identifies any entry in the specified category that simply includes the multi-character search string generated in step 302. In some embodiments, search engine 193 identifies any entry in the specified category that includes a word that begins with the multi-character search string generated in step 302. In yet other embodiments, search engine 193 identifies any entry in the specified category that starts with a word that begins with the multi-character search string generated in step 302.

In step 304, search engine 193 determines whether at least one matching entry has been identified in step 303. If yes, method 300 proceeds to step 305; if no, method 300 proceeds to step 310.

In step 305, search engine 193 causes a number of entries identified in the search of step 303 or step 312 to be displayed by infotainment system 190 and/or by navigation system 120. Generally, the number of identified entries that are caused to be displayed is not greater than a maximum allowable number of display entries for infotainment system 190 or navigation system 120. In some embodiments, the number (and size) of identified entries that are caused to be displayed in step 305 are selected to meet Alliance of Automobile Manufacturers (AAM) guidelines for in-motion safety. For example, but without limitation, the number of identified entries that are caused to be displayed in step 305 may be on the order of five to ten entries, since a greater number is generally considered too distracting for a driver to read. Method 300 then pauses until user 101 selects one of the displayed entries or another single-character input is received. In the latter case, method 300 returns to step 301.

In step 310, search engine 193 determines whether a "fuzzy" search mode is enabled, such as character keyboard proximity for identifying and correcting possible misspellings, or recently entered search strings for identifying search strings that are similar but not identical to the multi-character search string used in step 303. If yes, method 300 proceeds to step 311; if no, method 300 proceeds to step 314.

In step 311, search engine 193 generates one or more search strings based on a fuzzy search mode. In some embodiments, the search string or search strings generated in step 312 are based on corrected possible misspellings (for example based in part on keyboard proximity, skipped characters, and the like). In other embodiments, the search string or search strings generated in step 312 are based on recently entered search strings that are similar in some way to the search string character input received in step 301. In some embodiments, a combination of one or more such fuzzy search modes may be employed to generate the one or more search strings in step 311.

In step 312, search engine 193 searches the database that is stored in infotainment system 190, navigation system 120, vehicle control system 110, or is otherwise associated with vehicle information system 100, to identify matching entries. In some embodiments, search engine 193 identifies any entry in a specified category that matches one or more of the multi-character search strings generated in step 312. Method 300 then proceeds to step 305.

In step 314, search engine 193 causes an error message to be displayed by infotainment system 190 and/or by navigation system 120 informing a user that no matches were found based on the character-based input received by search engine 193. In addition, search engine 193 may cause a selectable option to be displayed (e.g., a Delete Character Option) that allows the most recently received character input to be deleted by user 101.

In step 315, search engine 193 determines whether user 101 has selected the Delete Character Option and thereby deleted the most recently received character input. If yes, method 300 proceeds to step 317; if no, method 300 proceeds to step 316. In step 316, search engine 193 waits for additional input, e.g., the deletion of one or more character inputs received previously, initiation of a new search, cancellation of the current search, etc. When additional input is received, method 300 proceeds accordingly. In step 317, search engine 193 causes a number of entries identified in a previous iteration of method 300 to be displayed by infotainment system 190 and/or by navigation system 120. Specifically, in step 317, entries are displayed that were identified in the previous iteration of method 300, i.e., identified entries corresponding to the current search string with the latest character input deleted.

Thus, by implementation of method 300, user 101 can quickly select an entry from any database associated with vehicle information system 100 by using verbal input or keyboard-based input. Because search engine 193 includes a multi-character search string algorithm, the number of entries identified by search engine 193 can be reduced to a manageable and displayable number with only a small number of single-character inputs. Furthermore, single-character input is well-suited for use in noisy environments when voice-recognition software is employed to interpret user input.

In sum, embodiments of the invention set forth systems and methods for selecting an entry in a database associated with an IVI system. By generating a multi-character search string based on single-character input from a user, a search engine can quickly reduce the number of entries in the database matching the multi-character search string. Advantageously, a small number of single-character inputs can be used to select a target entry from the database, even when there are strict limits on how many entries can be displayed to a vehicle operator.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The claimed invention is:

1. One or more non-transitory computer readable media storing instructions that, when executed by one or more processors, cause the one or more processors to display an entry from a database by performing steps of:
   receiving a second single-character input after receiving a first single-character input; and
   in response to receiving the second single-character input:
      generating a first multi-character search string, wherein a first character of the first multi-character search string comprises the first single-character input, and a second character of the first multi-character search string comprises the second single-character input;
      searching a database stored in an in-vehicle infotainment system for a first set of entries, wherein each entry in the first set of entries includes a first segment that matches the first multi-character search string; and
      when the database does not store at least one entry that includes the first segment that matches the first multi-character search string:
         generating, based on a fuzzy search mode that replaces the second single-character input in the first multi-character search string with a different character based on keyboard proximity to the second single-character input, a second multi-character search string, searching the database using the second multi-character search string, and upon identifying a second set of entries that each include a second segment matching the second multi-character search string, causing at least a first entry of the second set of entries to be displayed on a display device associated with the in-vehicle infotainment system; and when the database stores at least one entry that includes the first segment that matches the first multi-character search string, causing a first portion of the first set of entries to be displayed on the display device.

2. The one or more non-transitory computer readable media of claim 1, wherein the second set of entries that match the second multi-character search string include entries that include a word that begins with the second multi-character search string.

3. The one or more non-transitory computer readable media of claim 1, wherein the database includes data that are received from a portable computing device.

4. The one or more non-transitory computer readable media of claim 3, wherein the data received from the portable computing device are associated with a specific user of the portable computing device.

5. The one or more non-transitory computer readable media of claim 1, wherein receiving the second single-character input comprises receiving a voice-activated input.

6. The one or more non-transitory computer readable media of claim 5, wherein receiving the voice-activated input comprises receiving preparatory input that initiates a character-based search algorithm.

7. The one or more non-transitory computer readable media of claim 6, wherein the preparatory input comprises one of a gesture-based command associated with a touch-sensitive display screen of the in-vehicle infotainment system or the voice-activated input.

8. A computer-implemented method of selecting an entry in a database, the method comprising:

receiving a second single-character input after receiving a first single-character input; and in response to receiving the second single-character input:

generating a first multi-character search string, wherein a first character of the first multi-character search string comprises the first single-character input, and a second character of the first multi-character search string comprises the second single-character input;

searching a database stored in an in-vehicle infotainment system for a first set of entries, wherein each entry in the first set of entries includes a first segment that matches the first multi-character search string; and when the database does not store at least one entry that includes the first segment that matches the first multi-character search string:

generating, based on a fuzzy search mode that replaces the second single-character input in the first multi-character search string with a different character based on keyboard proximity to the second single-character input, a second multi-character search string, searching the database using the second multi-character search string, and upon identifying a second set of entries that each include a second segment matching the second multi-character search string, causing at least a first entry of the second set of entries to be displayed on a display device associated with the in-vehicle infotainment system; and when the database stores at least one entry that includes the first segment that matches the first multi-character search string, causing a first portion of the first set of entries to be displayed on the display device.

9. The method of claim 8, further comprising:

receiving a third single-character input after receiving the second single-character input;

in response to receiving the third single-character input:

generating an additional multi-character search string, wherein:

the first character of the additional multi-character search string comprises the first single-character input, the second character of the additional multi-character search string comprises one of the second single-character input or the different character that replaced the second single-character input, and a third character of the additional multi-character search string comprises the third single-character input;

searching the database using the additional multi-character search string;

when the database does not store at least one entry that includes a third segment that matches the additional multi-character search string, generating, the fuzzy search mode that replaces the third single-character input with a fourth character based on keyboard proximity to the third single-character input, a third multi-character search string, searching the database using the third multi-character search string, and upon identifying a third set of entries that each include a fourth segment matching the third multi-character search string, causing at least a first entry of the third set of entries to be displayed on the display device; and when the database stores at least one entry that includes the third segment that matches the additional multi-character search string, causing the at least one entry including the third segment to be displayed on the display device.

10. The method of claim 8, wherein receiving the second single-character input comprises receiving a voice-activated input.

11. The method of claim 10, wherein receiving the voice-activated input comprises receiving a preparatory input that initiates a character-based search algorithm.

12. The method of claim 11, wherein the preparatory input comprises one of a gesture-based command associated with a touch-sensitive display screen of the in-vehicle infotainment system or a voice-activated input.

13. The method of claim 8, wherein receiving the second single-character input comprises receiving a character input via a touch-sensitive display device associated with the in-vehicle infotainment system.

14. The method of claim 8, wherein the database includes data associated with a navigation system.

15. An information system, comprising:
a memory storing a search algorithm;
a display device; and
processor coupled to the memory and the display device that executes the search algorithm to:
  receive a second single-character input after receiving a first single-character input;
  in response to receiving the second single-character input:
    generate a first multi-character search string, wherein a first character of the first multi-character search string comprises the first single-character input, and a second character of the first multi-character search string comprises the second single-character input;
    search a database stored in an in-vehicle infotainment system for a first set of entries, wherein each entry in the first set of entries includes a first segment that matches the first multi-character search string;
    when the database does not store at least one entry that includes the first segment that matches the first multi-character search string:
      generate, based on a fuzzy search mode that replaces the second single-character input in the first multi-character search string with a different character based on keyboard proximity to the second single-character input, a second multi-character search string,
      searching the database using the second multi-character search string, and
      upon identifying a second set of entries that each include a second segment matching the second multi-character search string, causing at least a first entry of the second set of entries to be displayed on a display device associated with the in-vehicle infotainment system; and
    when the database stores at least one entry that includes the first segment that matches the first multi-character search string, cause a first portion of the first set of entries to be displayed by the display device.

16. The information system of claim 15, further comprising a microphone configured to receive voice-activated inputs.

17. The information system of claim 15, wherein the display device includes a touch-sensitive screen configured to receive the first single-character input and the second single-character input.

18. The information system of claim 15, wherein:
the information system further comprises a first network that is part of a network that includes the database; and
the first network couples the processor, the memory, and the display device to each other.

19. The information system of claim 18, wherein the first network includes:
a wired network,
a wireless network, or
a combination of the wired network and the wireless network.

* * * * *